United States Patent Office 3,578,605
Patented May 11, 1971

3,578,605
PROCESS FOR MAKING DUAL WALLED
MICROCAPSULES
George Baxter, Font Hill, Ontario, Canada, assignor to
Moore Business Forms, Inc., Niagara Falls, N.Y.
No Drawing. Filed Aug. 2, 1968, Ser. No. 749,600
Int. Cl. B01j 13/02; B44d 1/16; A61k 9/04
U.S. Cl. 252—316
10 Claims

ABSTRACT OF THE DISCLOSURE

A method of forming dual walled microcapsules around core particles or nuclei of oily or solvent material in which the oily or solvent material containing a dibasic or long-chain organic acid chloride is dispersed in an aqueous solution of a hydrophilic colloidal protein and a second hydrophilic colloid which is adapted to undergo coacervation with the colloidal protein upon a reduction in the pH of the aqueous solution. The acid chloride reacts with the protein to form a thin film of insolubilized protein around the core particles or nuclei, releasing hydrochloric acid as a reaction by-product which lowers the pH of the aqueous solution to the point at which coacervation of the colloids takes place, depositing an outer shell of complex coacervate. The dual-walled capsules can be given a hardening treatment, using formaldehyde or the like. The resultant capsules retain even relatively volatile matter for long periods of time.

BACKGROUND

It is old to prepare so-called dual-wall microcapsules on which the wall or shell of the microcapsules is constructed of two or more thicknesses of material, usually of different chemical constitution. In this way, products which were more durable and better adapted for handling could be obtained. For example, the inner wall could be formulated for improved resistance to chemical or solvent attack by the core material while the outer wall could be designed for high resistance to the atmosphere or other environment.

U.S. Pat. 2,969,331, to Brynko et al., filed July 14, 1958, is one of the earlier patents dealing with the formation of microcapsules of the type in question. Here, core particles of an oil having polymerizable monomeric material, e.g. of an acrylate or other vinyl-type monomer, dissolved therein are dispersed in an aqueous solution of a film-forming hydrophilic colloid, the monomeric material is caused to polymerize in situ to deposit solid polymer as an inner wall around the core particles and the colloid is subjected to coacervation to deposit solid coavervate as an outer wall by adjusting the pH of the system to the coacervation point of the colloid and gelling the coacervate by chilling.

U.S. Pat. 3,242,051 to Hiestand et al., filed Dec. 22, 1958, represents a variation of the above approach in which a synthetic linear polymer is caused to deposit out of solution in a nonaqueous solvent by a phase separation procedure accomplished by the addition to the solution of a liquid which is miscible with the polymer solvent but which is itself a non-solvent for the polymer, after which an outer wall of a hydrophilic colloid or other polymeric material soluble in aqueous solution is formed by complex coacervation as in the first patent mentioned above or by a phase separation technique similar to that used for the inner wall.

In the U.S. Pat. 3,205,175, to Maierson, filed Mar. 9, 1960, a "lining" of ethyl cellulose is applied to the inner surface of microcapsules of the type prepared according to U.S. Pats. 2,800,457 and 2,800,458. This result is achieved by dissolving ethyl cellulose in the oil of the core particles to be encapsulated so that when the oil is dispersed in an aqueous solution for purposes of depositing a shell of complex coacervate, the hydrophobic ethyl cellulose is precipitated at the particle interface by the presence of the water in the system.

Finally, U.S. Pat. 3,190,837, also to Brynko et al., filed Dec. 31, 1958, relates to the formation of microcapsules having multiple layers of the same shell-forming material which are produced in successive stages of coacervation to form a first layer of complex coacervate, decoacervation of excess undeposited coacervate accompanied by addition of fresh coacervate-forming colloid if necessary, and re-coacervation to deposit a second layer of complex coacervate.

In each of the above-mentioned procedures, the techniques for forming the individual walls are essentially separate and independent from each other, the effect being of superimposing one distinct wall-forming process upon the product of another distinct wall-forming process, each of the two processes requiring control of reaction conditions and manipulation of components in the manner peculiar to it with little or no relation to the requirements of the other.

STATEMENT OF OBJECTS

The object of this invention is a unitary or integral method of preparing dual-walled microcapsules which is self-completing, the technique for producing the inner wall automatically initiating the technique for forming the outer wall.

Another object of this invention is the creation of dual-walled shells around finely divided droplets of oil or the like by means of chemical reaction to produce film-forming material at the interface of the droplets and the surrounding aqueous solution and deposit an inner wall around each droplet, followed automatically by the formation of the outer wall as a natural effect of the products of the interfacial reaction upon coacervatable colloid material in the aqueous medium.

SUMMARY

According to the invention, a hydrophilic proteinaceous colloid is deposited from an aqueous solution around core particles of non-aqueous solvent dispersed in the aqueous solution, such deposition resulting from a reaction with a protein-insolubilizing reactant, which also releases an acid as a byproduct. The aqueous solution contains a second hydrophilic colloid adapted to undergo coacervation with the proteinaceous colloid upon reduction in pH to within a predetermined pH range necessary for coacervation of the colloids in question and such pH reduction is achieved by the acid thus released into the system.

DESCRIPTION

The encapsulated material referred to as "oil" or "solvent" in this specification includes any fluid immiscible in water which is suitable for making aqueous emulsions and is capable of dissolving the insolubilizing reactants for the proteinaceous colloid. Included are mineral oils, vegetable oils, synthetic oils, non-polar solvents both volatile or otherwise, and the like. Examples are toluene, xylene, heptane, chlorinated biphenyl and methyl phthalyl ethyl glycolate, to mention just a few of those known in the art. Because of the varied uses for microencapsulated substances, often the oil is merely a carrier for any desired ingredient such as a dye, a medicine, etc. to be encapsulated. The oil in such cases must be compatible with any active ingredient and have such other properties as may be needed for the particular circumstances. For example, if the active ingredient is to be dissolved, the oil must be an effective solvent for that ingredient. The other important property for the oil is a solvent action for the organic acid chloride utilized in the invention for a purpose to be described. In other respects, such as viscosity, volatility, etc., the properties of the oil can be varied as best suits the requirements of the final product in question.

The inner wall of the dual wall capsules of this invention is formed by an interfacial chemical reaction between an organic acid chloride carried in the dispersed oily phase and a water-soluble proteinaceous hydrophilic colloid dissolved or suspended in the aqueous continuous phase. This reaction takes place between the amino groups of the protein and the acyl chloride group and serves the purpose of insolubilizing the water-soluble proteinaceous colloid with the result that a thin film of the insolubilized protein is formed at the interface of the dispersed particles and the continuous phase, encapsulating the particles therein. Gelatin has been found to function in a highly satisfactory manner as the proteinaceous colloid and is preferred; however, it is believed that other water-soluble colloidal proteins can be substituted without crucial loss of effectiveness.

Two somewhat different types of organic acid halides have been found to be useful in undergoing reaction with the protein, namely polycarboxylic acid chlorides and long-chain monoacid chlorides having at least about 7 carbon atoms in the chain. In the first case, those molecules of the polyfunctional acid halide which are disposed at the interface of the oil particles appear to participate in a type of cross-linking reaction with the protein molecules adjacent the interface, insolubilizing the protein molecules as a film around the particles. Examples of this type of acid halide are terephthalic acid chloride, isophthalic acid chloride, adipic acid chloride and sebacic acid chloride, among others. Polyfunctional acids having more than two acid chloride groups, such as 1,3,5-benzene tricarboxylic acid, are effective. Sulfonic acid analogues, such as 1,3,5-benzene trisulfonic acid chloride, should also prove useful. For these classes of acid chlorides, the number of carbon atoms does not appear to be material and ring arrangements as well as open chains are suitable.

In the second case, the acid chloride molecules are thought to orient themselves generally perpendicularly of the particle interface with the acid halide group directed outwardly. Molecules having a hydrocarbon chain of the order of 7 or more carbon atoms with an attached ionizable, hydrophilic end group are known to have surface active properties. Thus, the affinity of the long-chain portion of the acid halide molecules for the oily dispersed phase is presumably sufficiently great to retain the long-chain portion in the dispersed phase adjacent to the interface while the acid halide group is available for reaction with the protein molecules in the aqueous phase of the emulsion. In this manner, the protein molecules are held in a cluster at the interface, producing an insoluble film.

The apparent effect of the reaction is to introduce the long-chain acid groups as hydrophobic side chains into the molecules of the protein, which groups reduce the normal capacity of the protein molecules to hydrate, forcing the molecules out of solution to deposit as a solid precipitate around the particles. It is known that protein solutions, within proper concentration limits as herein contemplated, are sols, i.e. colloidal solutions, the existence of which depends upon a fairly delicate balance in conditions. The presence of the hydrophobic side chains is thought sufficient to upset that balance and selectively precipitate the substituted protein molecules around the dispersed phase particles.

It will be appreciated, of course, that the explanations given above are speculative and may not be entirely correct. Whatever the true theoretical explanation, the practice of the invention as described herein does result in the formation of a thin film of insolubilized protein material around the dispersed phase particles and an understanding of the reasons for this phenomenon is not necessary to such practice. Examples of acid halides of this type include the chlorides of caprylic acid, capric acid, lauric acid, stearic acid, behenic acid as well as oleic acid and brassidic acid, to mention a few.

The outer wall of the microcapsules is formed by coacervation in the manner well-known in the art. Coacervation requires the presence of two gelable hydrophilic colloids, one of which is the protein utilized in the reaction with the acid chloride. The selection of a second colloid capable of undergoing coacervation with the reactable protein will be obvious to the skilled worker familiar with U.S. Pats. 2,800,457 and 2,969,331, among others. Gum arabic is a preferred second colloid.

The range of amounts used in the coacervatable colloid system is that which is conventional in this art. For example, there appears in FIG. 2 of U.S. Pat. 2,800,457 a ternary diagram depicting the concentration ranges where gelatin and gum arabic forming a complex coacervate in aqueous solution. The proper ranges for any other combination of colloids may similarly be determined experimentally.

Although some of the protein is consumed in the formation of the inner wall, the amount thus lost is apparently relatively small and the applicant has not found it necessary to add additional protein to make up the quantity lost. If desired, however, the supply of protein could be replenished before carrying out the complex coacervation as is taught in U.S. Pat. 3,190,837, or the intial amount of the proteinaceous colloid adjusted to compensate for that to be consumed.

The amount of the acid halide needs to be determined empirically since it will vary with the particular halide, the solvent that is selected, the particular coacervatable system and perhaps with other conditions. Those skilled in coacervation will recall that the colloid complex is formed when the pH of the system is adjusted to within fairly critical limits, for example, pH 4.4–4.6 for gelatin and gum arabic within certain concentration ranges. The fundamental criteria for the quantity of acid halide is the amount of free acid needed to be released as a byproduct of the protein insolubilizing reaction to produce a decrease in the pH of the system to within the coacervation range. This amount can be gauged experimentally without difficulty. If the amount of the acid halide is too great so that excess free acid is released and too low a pH is achieved, the result is a rapid precipitation of the colloid into a solid mass rather than a preferential deposition of the complex coacervate around the dispersed phase particles. On the other hand, if insufficient acid halide is present, the coacervation range will not be reached and the complex coacervate will not form.

As the examples indicate, the amount of the acid halide needed for purposes of the invention is quite small, say in the order of 0.05–.001 gm. per gm. of the reactable protein, dependent, of course, upon the starting pH of the system. It has been found that so long as the amount of acid halide is sufficient to reduce the pH of the system the requisite extent, sufficient protein will be insolubilized to give the film for the inner wall.

Preferably, the initial pH of the emulsion is maintained reasonably near the coacervate region although, of course, outside that region. It has been found that coacervatable systems of gelatin and gum arabic, for example, prepared for this invention in the conventional manner tended to exhibit a pH of about 4.9–5.1 and could be used with good effectiveness without further pH adjustment. Higher pH's can be employed if desired, and pH's up to about pH 6.5 have created no observable difficulties. The selection of higher pH's, however, were not necessary to the formulation of suitable coacervatable systems and did not contribute any particular advantages or improvement; consequently deliberate measures to increase the starting pH do not seem worthwhile and are not preferred.

The preferred procedural steps for making dual walled capsules according to this invention are as follows:

(1) A solution of the acid chloride in oil or solvent is prepared.

(2) Aqueous solutions of two ionizable hydrophilic colloids are prepared in appropriate concentrations and mixed. The pH of the mix must be such that the colloidal particles carry charges of opposite polarity and can be generally about 5. If the pH is lower than this, it may be adjusted to 5 by careful addition of aqueous alkali. Higher pH's only require the use of larger amounts of acid halide.

(3) The acid chloride solution is added to the mixture of step (2) with vigorous agitation to produce a dispersed phase of oil droplets of approximately 1–15 microns diameter, which droplets are encased in a thin, flexible film.

(4) The emulsion is then cooled to about 10° C. over a period of 30 minutes, with constant stirring, to form a deposit of gelled complex coacervate around the film-encased droplets.

(5) The dual walled microcapsules thus formed are hardened by an appropriate process.

Following step (3), if an examination is made of the emulsion under a microscope, a thin film or skin can be observed around each droplet. When a sample of the thus-encased droplets is dried in air and washed with a solvent, such as toluene, little or no oil is extracted; confirming that the inner wall has formed as an impermeable skin around the droplets. Similarly, if the product of step (5) is examined microscopically, the formation of a second wall layer can be seen. This outer wall has a considerably greater thickness than does the inner wall and is more gelatinous in character. It can be easily distinguished from the inner wall under a microscope.

It has been experimentally observed that the pH of the mixture of step (3) drops from 5 to 4.5 during the mixing and agitation, indicating that the theory of the formation of the inner wall is probably correct. The temperature of the emulsion following the formation of the inner wall is in the range 40–50° C. The lowering of the temperature to 10° C. as indicated in step (4) will gel the coacervate.

It is known in the art to harden the walls of microcapsules obtained via complex coacervation by the addition of formaldehyde or some compound releasing formaldehyde under the prevailing conditions and this feature can be used here either before or after step (4) or omitted. In any case, the mechanism of wall formation is not affected. Adjustment of the system pH during the hardening step to about pH 9 may be advantageous.

The following examples will serve to illustrate the invention:

EXAMPLE 1

A solution of 5 g. gelatin (Viscomix, Swift) in 150 g. water was thoroughly mixed with a solution of 5 g. gum arabic (Hallmark, Stein-Hall Co.) in 150 g. water and the pH was measured and found to be 5.2 at 47° C. Into this solution was emulsified a solution of 70 mg. of sebacyl chloride in 20 g. Bronoco 360 (Ashland Oil Co., B.P. 310° F.); agitation was continued at high speed in a Waring Blendor for 2 minutes. The pH of the resultant emulsion was approximately 4.5, and the Bronoco solvent droplets (5–10 microns diameter) were seen to be encased in thin shells which were stable on drying on a microscope slide. The emulsion temperature at this point was approximately 50° C. 2 mls. of 37% aqueous formaldehyde were then added with further agitation. The emulsion temperature was then lowered to 10° C. with continuous stirring over a period of 30 minutes. Microscopic examination at this stage shows the formation of a relatively thick semitransparent, gelatinous layer (coacervate) on top of the first thin shell of the droplets, and, in some cases, agglomeration of droplets within the coacervate. The pH of the mix was then adjusted to 9 with aqueous sodium hydroxide. The resultant solid materials were filtered off and dried. A sample of the dry material released copious quantities of the solvent under pressure and burned brightly on exposure to a naked flame. A further sample of the dry solid was placed in an oven at 100° C. for several hours, and it still burned brightly on exposure to a flame. Some Bronoco solvent placed in the same oven on an open watchglass, evaporated completely within 30 minutes.

EXAMPLE 2

157 mg. of decanoyl chloride dissolved in 20 g. of Texaco 538 oil were emulsified into a solution of 5 g. Viscomix gelatin and 5 g. Hallmark gum arabic in 300 g. water and high speed agitation was continued for 2 minutes. The average emulsion oil droplet size was about 15 microns and again a stable, thin film was formed around each droplet which was resistant to washing with toluene. The emulsion temperature was in the range of 40–44* C. during the emulsification. After the formaldehyde addition, the temperature was lowered to 10° C. as in Example 1 and the coacervate deposited on top of the first skin around the oil droplets was gelled. The final pH adjustment to 9 hardened this outer layer. The microcapsules were filtered off and air-dried, then a sample was imersed in hot toluene at 90° C. for 2 hours. The toluene-washed sample released copious quantities of oil under pressure.

EXAMPLE 3

U.S. Pat. 3,293,060 describes a technique of color formation accomplished by bringing a spirodipyran precursor in contact with an acid-activated clay. Microcapsules containing the colorless precursor 3-octyl spirodi-(naphthopyran) were prepared as follows. 5 g. gelatin was dissolved in 150 g. water, and mixed thoroughly with a second solution of 5 g. gum arabic in 150 g. water. The pH of the mix was 5.1 at 45° C. 0.6 g. of the colorless precursor was dissolved in 20 g. Bronco 360, followed by 70 milligrams of terephthalylchloride. This solution was then emulsified vigorously into the gelatin/gum arabic solution for 2 minutes at high speed in the Waring Blendor; the emulsion pH was 4.5 at about 47° C. 2 mls. of 37% aqueous formaldehyde were added and the entire emulsion cooled to 10° C. with continuous stirring over a period of about 30 minutes. The emulsion pH was adjusted to 9 with aqueous sodium hydroxide and vigorous stirring. Coatings of the emulsion were prepared on Bond paper and oven-dried at 100° C. for 15–20 seconds. A dense blue write-off was obtained when writing pressure was applied to one of the coated sheets while in contact with an acid-activated clay-coated sheet.

That which is claimed is:

1. A process for forming dual walled microcapsules around oil nuclei which comprises:
   (a) preparing a solution of oil and an organic acid chloride of the group consisting of polyacid chloride and a long chain monoacid chloride having at least 7 carbon atoms in the chain;
   (b) preparing an aqueous solution of gelatin and an ionizable water-soluble hydrophilic colloid other than gelatin which is adapted to form with gelatin complex coacervate units upon a reduction in pH of the solution below the point at which coacervation occurs, said solution being prepared at a pH above said coacervation point;
   (c) dispersing the oil solution in the aqueous colloid solution, whereby the acid chloride reacts with the gelatin to produce a film of insolubilized gelatin around the dispersed phase particles, releasing free hydrochloric acid as a by-product, said free acid reducing the pH of said aqueous solution to below said coacervation point to effect coacervation of said gelatin and other colloid and deposit complex coacervate units as a second layer around said dispersed phase particles; and (d) cooling the aqueous solution to gel the complex coacervate units.

2. The process of claim 1 wherein the other hydrophilic colloid is gum arabic.

3. The process of claim 1 wherein at least said second wall layer of gelled coacervate units is subjected to a hardening treatment.

4. The process of claim 3 wherein said wall layer is hardened with formaldehyde.

5. The process of claim 4 wherein an aqueous solution containing formaldehyde or a compound-releasing formaldehyde is added to said two phase system before or after step (d).

6. The process of claim 5 wherein, after step (d), the pH of said aqueous solution is raised to pH 8–9 to promote said hardening.

7. The process of claim 1 wherein said organic acid chloride is an alkanoyl or alkenoyl chloride having from about 8–22 carbon atoms or an aliphatic or aromatic diacid chloride.

8. The process of claim 1 wherein said solutions are prepared at a temperature of about 40–50° C.

9. The process of claim 1 wherein said oil solution has incorporated therein a dye or pigment.

10. The process of claim 1 wherein the dual walled capsules are recovered from said solutions and dried.

References Cited

UNITED STATES PATENTS

| | | |
|---|---|---|
| 2,800,457 | 7/1957 | Green et al. |
| 2,969,331 | 1/1961 | Brynko et al. |
| 3,270,100 | 8/1966 | Jolkovski et al. |
| 3,328,257 | 6/1967 | Vrancken et al. |

RICHARD D. LOVERING, Primary Examiner

U.S. Cl. X.R.

117—36.2, 81, 100; 424—34, 37